(12) United States Patent
Shi et al.

(10) Patent No.: US 8,791,927 B2
(45) Date of Patent: Jul. 29, 2014

(54) STYLUS HAVING MAGNIFYING LENS

(75) Inventors: Zheng Shi, Shenzhen (CN); Guo-Wu Jiang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 410 days.

(21) Appl. No.: 13/095,009

(22) Filed: Apr. 27, 2011

(65) Prior Publication Data

US 2012/0262427 A1  Oct. 18, 2012

(30) Foreign Application Priority Data

Apr. 18, 2011 (CN) .......................... 2011 1 0095428

(51) Int. Cl.
*G06F 3/033* (2013.01)
*G06F 3/041* (2006.01)

(52) U.S. Cl.
USPC .................................... 345/179; 178/19.01

(58) Field of Classification Search
USPC ...................................... 345/179; 178/19.01
See application file for complete search history.

(56) References Cited

U.S. PATENT DOCUMENTS

| | | | |
|---|---|---|---|
| 2,100,239 A * | 11/1937 | Carlton | 359/815 |
| 2,509,837 A * | 5/1950 | Niizawa | 401/7 |
| 3,048,149 A * | 8/1962 | Guttman | 401/7 |
| 3,887,286 A * | 6/1975 | Bucey | 401/7 |
| 3,955,884 A * | 5/1976 | Del Pesco, Sr. | 359/815 |
| 4,738,556 A * | 4/1988 | Brown | 401/7 |
| 5,529,415 A * | 6/1996 | Bishop | 401/7 |
| 5,747,748 A * | 5/1998 | Zigler | 178/18.01 |
| 6,113,295 A * | 9/2000 | Bordelon | 359/809 |
| D487,896 S * | 3/2004 | Tanner, Jr. | D14/411 |
| D488,588 S * | 4/2004 | Murphy | D29/114 |
| 7,133,021 B2 * | 11/2006 | Coghan, IV. | 345/173 |
| D544,484 S * | 6/2007 | Hussaini et al. | D14/411 |
| D578,534 S * | 10/2008 | Shi et al. | D14/411 |
| 7,476,043 B1 * | 1/2009 | Rivas | 401/7 |
| D597,547 S * | 8/2009 | Smith | D14/411 |
| D610,145 S * | 2/2010 | Smith | D14/411 |
| D616,447 S * | 5/2010 | Smith | D14/411 |
| D618,243 S * | 6/2010 | Chamblin | D14/411 |
| D637,763 S * | 5/2011 | Hernandez | D29/114 |
| 8,169,422 B2 * | 5/2012 | Flachsbart | 345/179 |
| 8,336,119 B2 * | 12/2012 | Phelps et al. | 2/160 |
| 2003/0063253 A1 * | 4/2003 | Keene | 351/41 |
| 2004/0150616 A1 * | 8/2004 | Murphy | 345/156 |
| 2005/0093835 A1 * | 5/2005 | Mortarelli | 345/179 |
| 2006/0066563 A1 * | 3/2006 | Mochwart | 345/156 |

(Continued)

FOREIGN PATENT DOCUMENTS

| | | | | |
|---|---|---|---|---|
| CN | 201716471 | * | 1/2011 | G02B 25/00 |
| JP | 57-152034 | * | 9/1982 | G06F 3/03 |
| JP | 2004-219533 | * | 8/2004 | G02B 25/00 |

*Primary Examiner* — Adam J Snyder
(74) *Attorney, Agent, or Firm* — Novak Druce Connolly Bove + Quigg LLP

(57) ABSTRACT

A stylus for a portable electronic device includes a main body, a nib, and a lens. The main body defines a chamber in an end, the nib and the lens are connected to the other end of the main body. A space if formed between the nib and the lens. An extending direction of the nib intersects with an extending direction of the lens to form an angle, and the angle is in a range from 0°-90°.

10 Claims, 3 Drawing Sheets

(56) References Cited

U.S. PATENT DOCUMENTS

| | | | |
|---|---|---|---|
| 2006/0071915 A1* | 4/2006 | Rehm | 345/173 |
| 2007/0047223 A1* | 3/2007 | Mundhra et al. | 362/103 |
| 2008/0060107 A1* | 3/2008 | Capson | 2/21 |
| 2008/0106521 A1* | 5/2008 | Nave | 345/179 |
| 2008/0117189 A1* | 5/2008 | Flachsbart | 345/179 |
| 2008/0246745 A1* | 10/2008 | Shi et al. | 345/179 |
| 2009/0078478 A1* | 3/2009 | Newman | 178/19.01 |
| 2009/0115643 A1* | 5/2009 | Goffman | 341/22 |
| 2009/0289893 A1* | 11/2009 | Drangel et al. | 345/156 |
| 2010/0039392 A1* | 2/2010 | Pratt et al. | 345/173 |
| 2010/0271339 A1* | 10/2010 | Helm | 345/179 |

\* cited by examiner

STYLUS HAVING MAGNIFYING LENS

CROSS-REFERENCE TO RELATED APPLICATIONS

This application is one of the three related co-pending utility patent applications and three allowed design patent applications listed below. All listed patent applications have the same inventors and assignee. All listed utility patent applications are concurrently filed herewith. The disclosure of each of the listed applications is incorporated by reference into all the other listed applications.

| Ser. No. | Title | Inventors | Current Status |
| --- | --- | --- | --- |
| 29/380,862 | STYLUS HAVING FONT MAGNIFIER | Zheng Shi et al. | US D640,698 |
| 13/858,098 | STYLUS | Zheng Shi et al. | Notice of Allowance mailed |
| 29/383,733 | STYLUS HAVING FONT MAGNIFIER | Zheng Shi et al. | US D642,176 |
| 13/095,009 | STYLUS | Zheng Shi et al. | Present Application |
| 13/095,012 | STYLUS | Zheng Shi et al. | Issue Payment Received |
| 29/383,734 | STYLUS HAVING FONT MAGNIFIER | Zheng Shi et al. | US D642,177 |

BACKGROUND

1. Technical Field

This disclosure relates to a stylus for portable electronic devices.

2. Description of Related Art

Styluses are often used with touch screens of electronic devices. A stylus may include a main body and a nib portion formed at one end of the main body, and be configured for comfortably held and used by an average user. However, the typical pen-like configuration is often difficult for certain types of users to accurately use, such as users with vision deficiencies.

Therefore, there is room for improvement within the art.

BRIEF DESCRIPTION OF THE DRAWINGS

Many aspects of the stylus can be better understood with reference to the following drawings. The components in the drawings are not necessarily drawn to scale, the emphasis instead being placed upon clearly illustrating the principles of the multifunctional case.

DETAILED DESCRIPTION

Figure 1:
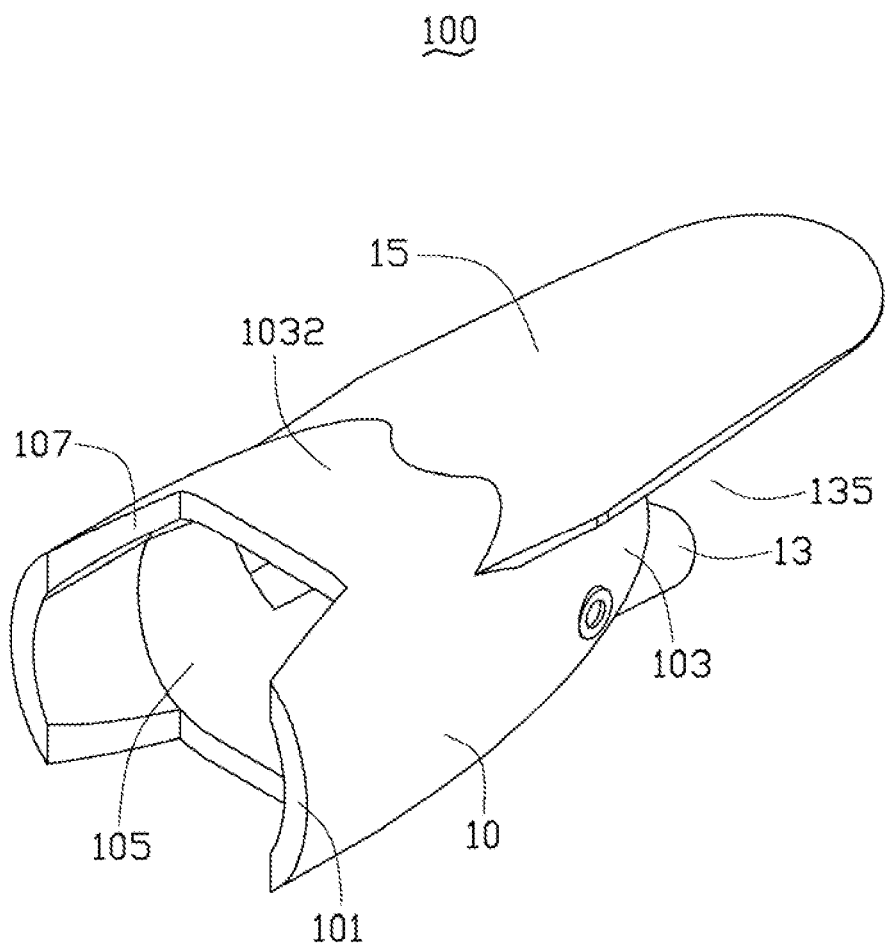
FIG. 1 is an integral schematic view of a stylus according to an exemplary embodiment.
Figure 2:
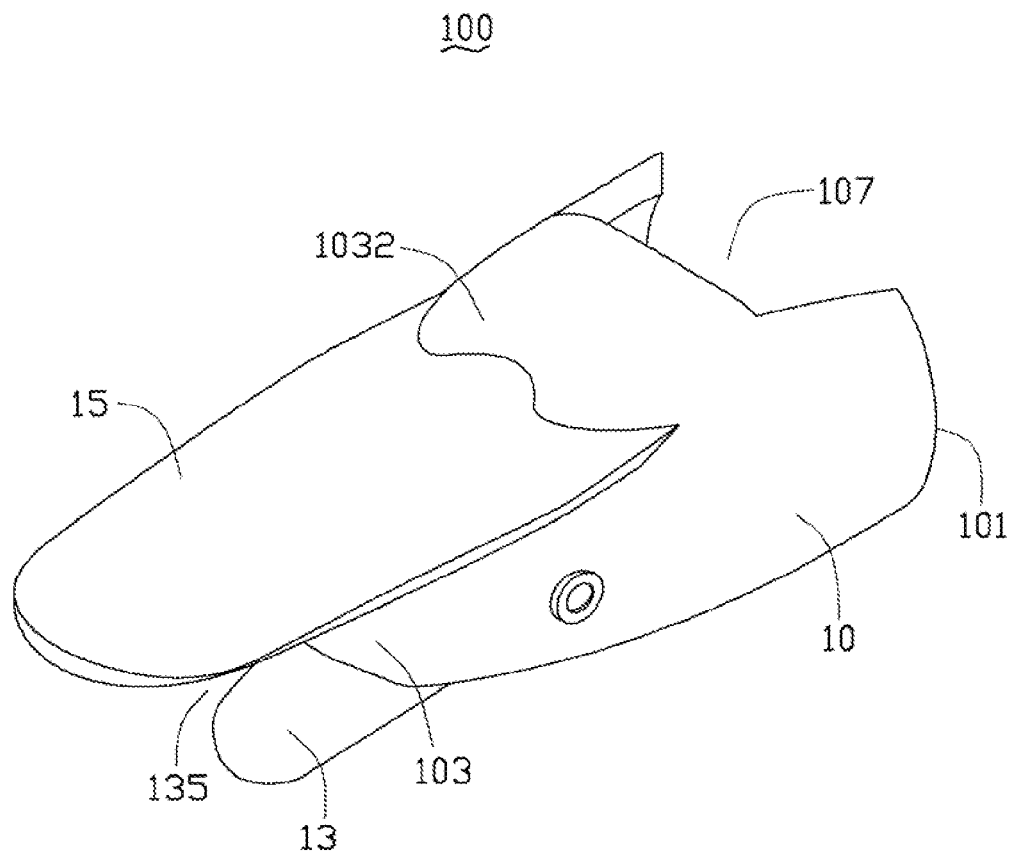
FIG. 2 is similar to FIG. 1, but viewed from another angle.
Figure 3:
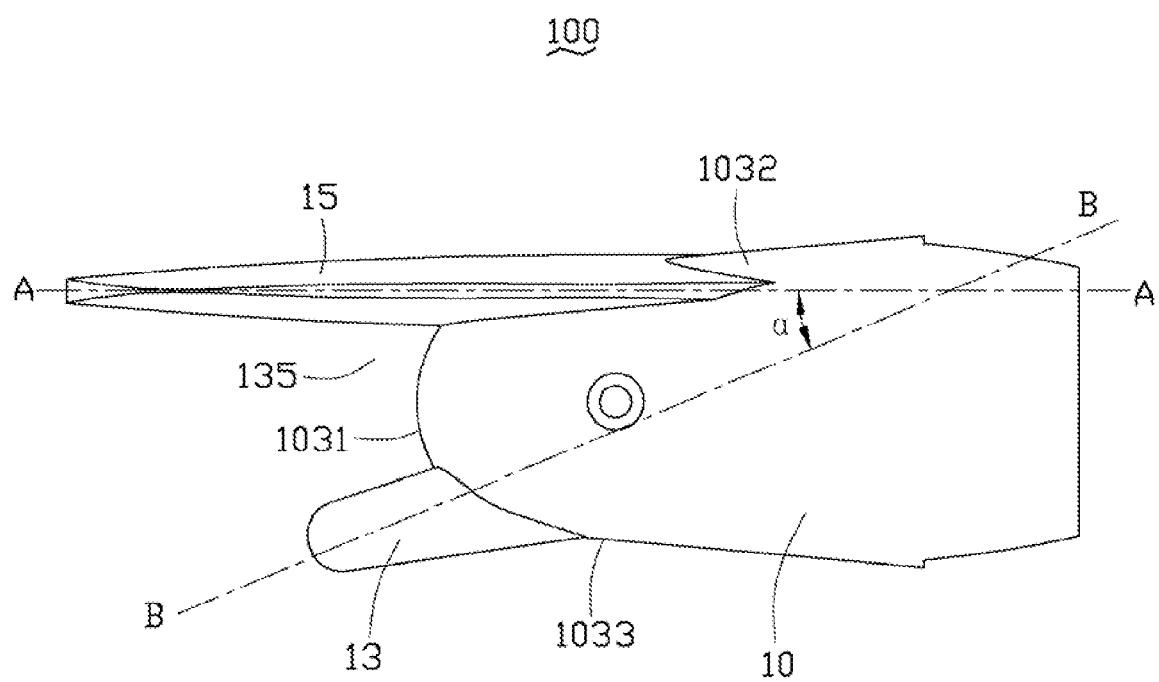
FIG. 3 is also similar to FIG. 1, but viewed from yet another angle.

FIGS. 1, 2 and 3 show an exemplary stylus 100 for a touch screen of a portable electronic device for inputting information, etc. The stylus 100 includes a main body 10, a nib 13, and a lens 15. The nib 13 and the lens 15 are connected to the same end of the main body 10, and a space 135 is defined between the nib 13 and the lens 15. The extending direction B-B of the nib 13 intersects with the extending direction A-A of the lens 15 to form an angle α in a range of 0°-90°.

The main body 10 is generally tubular and can be made of plastic materials such as Acrylonitrile Butadiene Styrene (ABS), Polycarbonate (PC), etc. The main body 10 includes an opening end 101 and an opposite sealing end 103. The opening end 101 defines a chamber 105 extending to the sealing end 103 and two opposite cutouts 107. The chamber 105, is configured for receiving and holding a finger of a user. The cutouts 107 communicate with the chamber 105. The cutouts 107 facilitate insertion of a user's finger into the chamber 105 to adjust the position of the finger in the chamber 105. The sealing end 103 has an irregular spherical surface 1031 including a top side surface 1032 and an opposite bottom side surface 1033.

The nib 13 is a tiny post and protrudes from the bottom side surface 1033 of the spherical surface 1031 for touching the screen of the portable electronic device. The nib 13 can be made of elastic plastic materials such as Thermo Plastic Urethane (TPU), to prevent wear of the screen from contact by the nib 13.

The lens 15 generally has an elongated shape. The lens 15 extends from the top side surface 1032 of the spherical surface 1031 and can substantially shield the nib 13. The lens 15 can be a concave lens to act as a magnifying lens for users to better see characters on the display written using the nib 13.

To use the stylus 100, a user inserts their finger into the chamber 105 to wear the stylus 100, and thus the nib 13 can touch and write characters on the screen by manipulation of the finger. Meanwhile, the user can clearly see characters on the screen because of magnification by the lens 15, helping the user to have greater accuracy when using the stylus 100.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stylus for a portable electronic device, comprising:
a main body having an end defined a chamber and two opposite cutouts communicating with the chamber, the two opposite cutouts facilitating insertion of a user's finger into the chamber to adjust the position of the finger in the chamber;
a nib and
a lens;
wherein the nib and the lens protrude and extend from the other end of the main body.

2. The stylus as claimed in claim 1, wherein a space is defined between the nib and the lens, an extending direction of the nib intersects with an extending direction of the lens to form an angle.

3. The stylus as claimed in claim 2, wherein the angle is in a range of 0°-90°.

4. The stylus as claimed in claim 1, wherein the main body includes an opening end and an opposite sealing end, the opening end defines the chamber, the chamber extends towards the sealing end.

5. The stylus as claimed in claim 4, wherein the opening end defines the opposite cutouts.

6. The stylus as claimed in claim 4, wherein the sealing end has a spherical surface including a top side surface and a bottom side surface, the top side surface has the lens protruding therefrom, the bottom side surface has the nib protruding therefrom.

7. The stylus as claimed in claim 1, wherein main body is made of plastic materials including Acrylonitrile Butadiene Styrene (ABS), Polycarbonate.

8. The stylus as claimed in claim 1, wherein the nib is made of elastic plastic materials including Thermo Plastic Urethane (TPU).

9. The stylus as claimed in claim 1, wherein the lens has an elongated shape and substantially shields the nib.

10. The stylus as claimed in claim 1, wherein the lens is a concave lens to act as a magnifying lens.

* * * * *